United States Patent [19]
Sugawara

[11] 4,083,570
[45] Apr. 11, 1978

[54] GASKET REINFORCED BY SLIT GROMMET

[75] Inventor: Minoru Sugawara, Odawara, Japan

[73] Assignee: Ishino Gasket Mfg. Co., Ltd., Tokyo, Japan

[21] Appl. No.: 671,686

[22] Filed: Mar. 29, 1976

[30] Foreign Application Priority Data
Oct. 17, 1975 Japan .......................... 50-141954[U]

[51] Int. Cl.² .............................................. F16J 15/12
[52] U.S. Cl. .................................... 277/235 B; 277/22
[58] Field of Search ............... 277/22, 235 B, DIG. 6, 277/215

[56] References Cited

U.S. PATENT DOCUMENTS

| 1,903,990 | 4/1933 | Fitzgerald | 277/235 B |
| 3,108,018 | 10/1963 | Lewis | 277/DIG. 6 |
| 3,784,212 | 1/1974 | Doerfling | 277/235 B |

*Primary Examiner*—Robert I. Smith
*Attorney, Agent, or Firm*—DeLio and Montgomery

[57] ABSTRACT

The gasket has a grommet about its holes and the grommet has a slit in the narrow area between the adjoining or adjacent holes where superior sealing is required. The gasket may have, when necessary, a sheet of a heat resisting material in said area.

4 Claims, 11 Drawing Figures

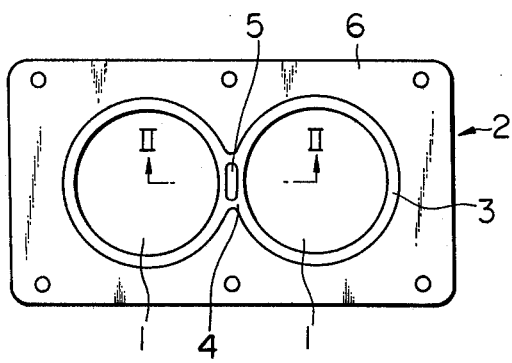
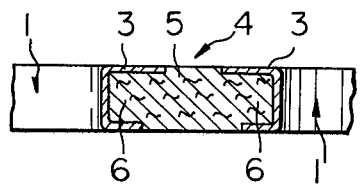
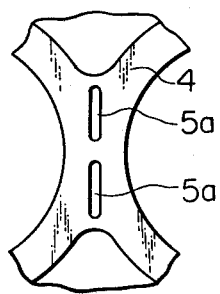
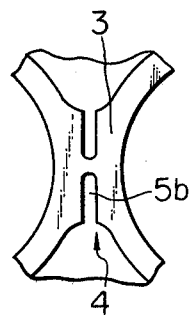
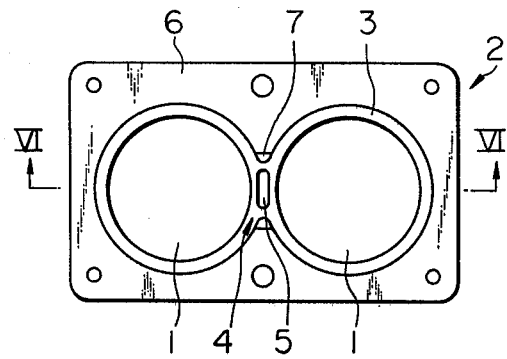

GASKET REINFORCED BY SLIT GROMMET

BACKGROUND OF THE INVENTION

The present invention relates to a gasket reinforced by a slit grommet and, particularly, to that of the type adapted for use on the cylinder head of an internal combustion engine.

Recently, for various reasons, for example, for compactness of design, multicylinder internal combustion engines have been manufactured with a very small distance between the cylinders. Accordingly, it is necessary that a grommet used in the cylinder bores of a cylinder head gasket having single or linked 8-shaped holes matching the peripheries of the cylinder bores be formed in one body. This structure of grommet has several disadvantages. For example, due to the pressing of the grommet face during assembly of the grommet in the gasket, and, also, deterioration of the gasket caused by the heat of combustion when in operation, there is distortion and non-uniform surface pressure on the gasket body or the portion thereof reinforced by the grommet, thereby causing leakage of gas between the adjoining or adjacent cylinder bores resulting in loss of sealing function as a gasket.

Accordingly, an object of the present invention is to provide a gasket reinforced by a slit grommet, which is free from the disadvantages described hereinabove and is capable of functioning efficiently as a gasket even when the area between the adjoining or adjacent cylinder bores is narrow.

Another object of the present invention is to provide a gasket reinforced by a slit grommet of a type particularly suitable for use on the cylinder head of a multicylinder internal combustion engine.

A further object of the present invention is to provide a gasket reinforced by a slit grommet with a sheet of a heat resisting material, which is free from the disadvantages described hereinabove and capable of functioning efficiently as a gasket even in a narrow space such as the area between the adjoining or adjacent cylinder bores.

A still further object of the present invention is to provide a gasket reinforced by a slit grommet with a sheet of a heat resisting material particularly of the type suitable for use with a cylinder head of a multicylinder internal combustion engine.

SUMMARY OF THE INVENTION

A feature of the gasket according to the present invention is that the grommet is provided with a slit in the portion, which is particularly narrow in width and in which particularly superior sealing is required, of the area between the adjoining or adjacent holes, for example the portion between the adjoining bores of the cylinder head of an internal combustion engine.

Another feature of the gasket according to the present invention is that a sheet of a heat resisting material is provided in the portion, which is particularly narrow in width and in which particularly superior sealing is required, of the area between the adjoining holes, for example the portion between the adjoining bores of the cylinder head of an internal combustion engine and that the grommet covering said portion is provided with a slit.

Heat resisting materials applicable in the present invention are, for example, graphite, asbestos, isolite, glass wool, etc. A graphite sheet is particularly effective. The term "graphite sheet" as used in this specification and claims is to be understood to generally refer to such materials as pure graphite formed in sheets (for example "Grafoil" produced by Union Carbide Company), graphite powder compression molded into sheets, and carbon sheet in general. These graphite sheets have lamellar chrystalline structure and are known to have excellent heat conductivity (about 80% that of copper) and dimensional stability in the planar direction (or horizontal axial direction) of the sheet and a good heat insulation and thermal expansibility and a superior elasticity (10% to 15% compression ratio) in the direction normal to the sheet face (or normal axial direction).

BRIEF DESCRIPTION OF THE DRAWINGS

These an other objects and features of the present invention will become apparent to those skilled in the art by the description of the preferred embodiments of the present invention with reference to the accompanying drawings in which:

FIG. 1 is a plan view of an embodiment of the gasket according to the present invention;

FIG. 2 is an enlarged fragmentary sectional view taken along the line II—II of FIG. 1;

FIGS. 3 and 4 are fragmentary plan views showing other forms of the slits;

FIG. 5 is a plan view of another embodiment of the gasket according to the present invention;

DESCRIPTION OF THE PREFERRED EMBODIMENTS

Figure 6:
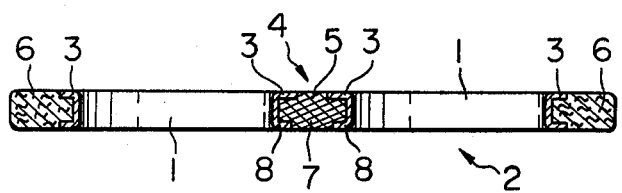
FIG. 6 is an enlarged sectional view taken along the line VI—VI of FIG. 5.

Preferred embodiments of the gasket according to the present invention will now be described with reference to the accompanying drawings. FIG. 1 shows an embodiment of the gasket 2 having two adjoining holes 1 about which is inserted a metal grommet 3. A slit 5 is provided in the grommet 3 at least in one face thereof in the area 4 between the two adjoining holes.

While the slit 5 may be formed with a suitable punching divice after the grommet is mounted, it is preferred to form the slit 5 at the same time as the punching and cutting of the grommet base sheet. Also, during the punching and cutting of the grommet base sheet, the shape of the inner peripheries of the holes of the grommet 3 corresponding to the holes 1 may be dimensioned to ensure that ends of the grommet 3 in the area 4 between the adjoining holes are spaced apart suitably to form the slit 5 or an opening corresponding thereto after pressing and leveling of the face of the gasket base sheet 6 where the ends of the grommet 3 extend. Or both of said methods may be employed to form the slit 5. FIG. 2 shows a section of the portion of the grommet where the slit 5 is formed at the same time as the punching and cutting of the grommet base sheet. As illustrated, the slit 5 is spaced suitably from the inner peripheries of the holes 1 for the reasons to be described hereinunder.

The dimensions and shape of the slit 5 are selected according to the dimensions and shape of the area 4 between the adjoining holes 1. The shape of the slit 5 may be an elongated slit as shown in FIG. 1 or it can be a series of slits 5a as shown in FIG. 3. Further, as shown in FIG. 4, the slit may open at the end reaching the outer peripheral edge of the grommet 3 in the area 4 between the adjoining holes.

Another embodiment of the present invention will now be described with reference to FIGS. 5 to 11. Through all of FIGS. 1 to 11 the same reference numeral is used to denote the same component or portion.

FIG. 5 shows a gasket 2 having two adjoining holes 1 about which is inserted a metal grommet 3. The gasket 2 further comprises a sheet 7 of a heat resisting material (for example, a graphite sheet) mounted in the area 4 between the adjoining holes.

The heat resisting sheet 7 is mounted through the following steps: a hole for the sheet 7 is made at the same time as the punching and cutting of the gasket base sheet 6, the sheet 7 is embedded in said hole, then the sheet 7 is secured together with the grommet 3 to the gasket base sheet 6.

Figure 7:
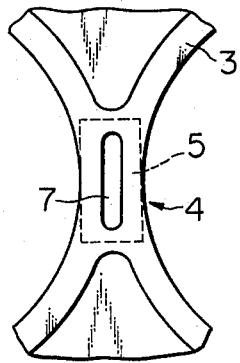
FIGS. 7-9 are enlarged fragmentary plan views showing other forms of the sheets of heat resisting materials.
Figure 8:
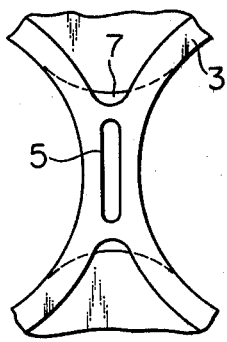
Figure 9:
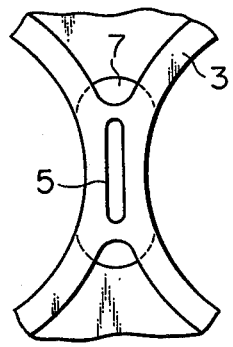

FIG. 6 shows an example of a section of the gasket thus formed, taken along the line VI—VI of FIG. 5. As illustrated, the sheet 7 is covered by the grommet 3 with only a portion of the slit 5 exposed and secured to the gasket base sheet 6. Accordingly, the heat resisting sheet 7 is prevented from getting loose and falling from the base sheet 6 by accident. The dimensions and shape of the heat resisting sheet 7 are selected according to the dimensions and shape of the area 4 between the adjoining holes. While the heat resisting sheet 7 is shown in FIG. 5 to be mounted extending in part beyond the grommet 3, the sheet 7 may be embedded in the grommet 3 as shown in FIG. 7. The sheet 7 may be formed in a simple rectangular shape as shown in FIG. 7. However, it may take various other forms as shown in, for example, FIGS. 8 and 9 considering various factors such as heat conductivity, leakage of gas, etc.

As described hereinabove, the slit may be formed by any suitable punching device after the grommet has been inserted. However, it is preferred to form the slit 5 at the same time as the punching and cutting of the grommet base sheet. In this embodiment, on the other hand, it is preferred to form the grommet 3 so that the peripheral edges 8 of the grommet 3 extending opposite each other through the opening 1 are spaced suitably from each other when mounted on the gasket base sheet 6. FIG. 6 shows a section of the portion where the slit 5 is formed at the same time as the punching and cutting of the gasket base sheet. As illustrated, the slit 5 is separated suitably from the inner peripheries of the holes 1 for the reasons to be explained hereinafter.

Figure 10:
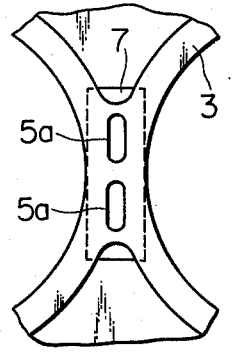
FIGS. 10 and 11 are fragmentary plan views showing other forms of the slits.
Figure 11:
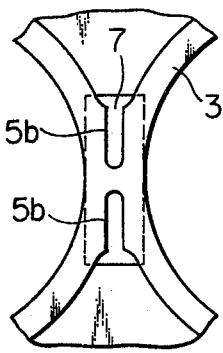

The dimensions and shape of the slit 5 are selected as described hereinabove, according to the dimensions and shape of the area 4 between the adjoining holes. The shape of the slit may be an elongated slit 5 as shown in FIG. 5. But it may be a series of slits 5a as shown in FIG. 10. Further, as shown in FIG. 11, it may be formed, as are slits 5b, open at the end reaching the outer peripheral edges of the grommet 3 in the area 4 between the adjoining holes.

The sheet of heat resisting material mounted on the area between the adjoining holes has a good resistance to deterioration due to high heat and the gap of the slit provided in the grommet in the area between and the adjoining holes absorbs distortions in the area between the adjoining holes during assembly and exhibits heat insulating effect to reduce the wear due to heat when in operation. Thus, according to the present invention, the sealing of the gasket is secured and the life thereof is noticeably improved.

A graphite sheet exhibits particularly good resistance to deterioration due to heat, even when used in a narrow portion such as the area between the adjoining holes, since the graphite sheet has good heat insulation, heat expansibility and elasticity in the normal axial direction and heat conductivity and dimensional stability in the horizontal axial direction. Graphite sheet is expensive, but according to the present invention, the desired effect is achieved with a minimum quantity of the graphite sheet.

Although only a few specific embodiments of this invention have been described it should be understood that various modifications may be made without departing from the scope of this invention which is defined by the appended claims.

What is claimed is:

1. A cylinder head gasket reinforced by a slit grommet for an internal combustion engine having a sheet of a heat resisting material mounted therein, comprising:
   a gasket base sheet having a plurality of holes and having an area between the adjoining holes cut away;
   a graphite sheet having a lamellar crystalline structure mounted on said cut-away area between the adjoining holes; and
   a grommet mounted on the peripheral edges of said holes and to said sheet and having a slit in at least one side of said area between the adjoining holes.

2. A gasket as set forth in claim 1, wherein said slit provided in the area between the adjoining holes of said grommet consists of one continuous long slit.

3. A gasket as set forth in claim 1, wherein said slit provided in the area between the adjoining holes of said grommet consists of a series of long slits.

4. A gasket as set forth in claim 3, wherein said slit provided in the area between the adjoining holes of said grommet consists of a long slit open at the end reaching the outer periphery of said grommet.

* * * * *